United States Patent [19]

Beifus

[11] Patent Number: 5,019,757
[45] Date of Patent: May 28, 1991

[54] METHOD AND APPARATUS FOR CONTROLLING A BLOWER MOTOR IN AN AIR HANDLING SYSTEM TO PROVIDE CONSTANT PRESSURE

[75] Inventor: Brian L. Beifus, Fort Wayne, Ind.

[73] Assignee: General Electric Company, Fort Wayne, Ind.

[21] Appl. No.: 495,419

[22] Filed: Mar. 19, 1990

[51] Int. Cl.$^5$ .............................................. H02P 7/06
[52] U.S. Cl. .................................... 318/254; 318/433
[58] Field of Search .............. 318/138, 254, 439, 644, 318/481, 432, 433, 434

[56] References Cited

U.S. PATENT DOCUMENTS

| | | | |
|---|---|---|---|
| 4,504,881 | 3/1985 | Wada et al. | 361/23 |
| 4,638,233 | 1/1987 | Erdman | 318/644 |
| 4,648,551 | 3/1987 | Thompson et al. | 236/49 |
| 4,667,480 | 5/1987 | Bessler | 62/180 |
| 4,806,833 | 2/1989 | Young | 318/335 |
| 4,818,924 | 4/1989 | Burney | 318/561 |
| 4,858,676 | 8/1989 | Bolfik et al. | 165/2 |
| 4,860,231 | 8/1989 | Ballard et al. | 364/571.01 |

Primary Examiner—Bentsu Ro
Attorney, Agent, or Firm—Ralph E. Krisher, Jr.

[57] ABSTRACT

Apparatus and method for controlling a motor having a stationary assembly with a plurality of winding stages for carrying motor current and further having a rotatable assembly in driving relation with a blower in an air handling system. The apparatus provides control of the pressure over a range of flow restrictions to maintain air pressure in the system at a relatively constant preselected level. The apparatus receives a preselected pressure signal representing the preselected air pressure level. A microprocessor, responsive to both the preselected pressure signal and a motor speed signal, generates a desired torque signal which is a function of the preselected pressure signal, the speed signal and a previous desired torque signal. The desired torque signal is compared to a signal representing motor torque and a comparison signal representing the comparison is generated. An IC control applies a motor voltage to one or more of the winding stages at a time in accordance with the comparison signal and commutates the winding stages in a preselected sequence to rotate the rotatable assembly. As a result, the blower is driven by varying the motor speed according to motor torque (i.e., torque compensated speed) to maintain substantially constant air pressure in the system at the preselected rate substantially independent of variations in the flow restrictions.

22 Claims, 3 Drawing Sheets

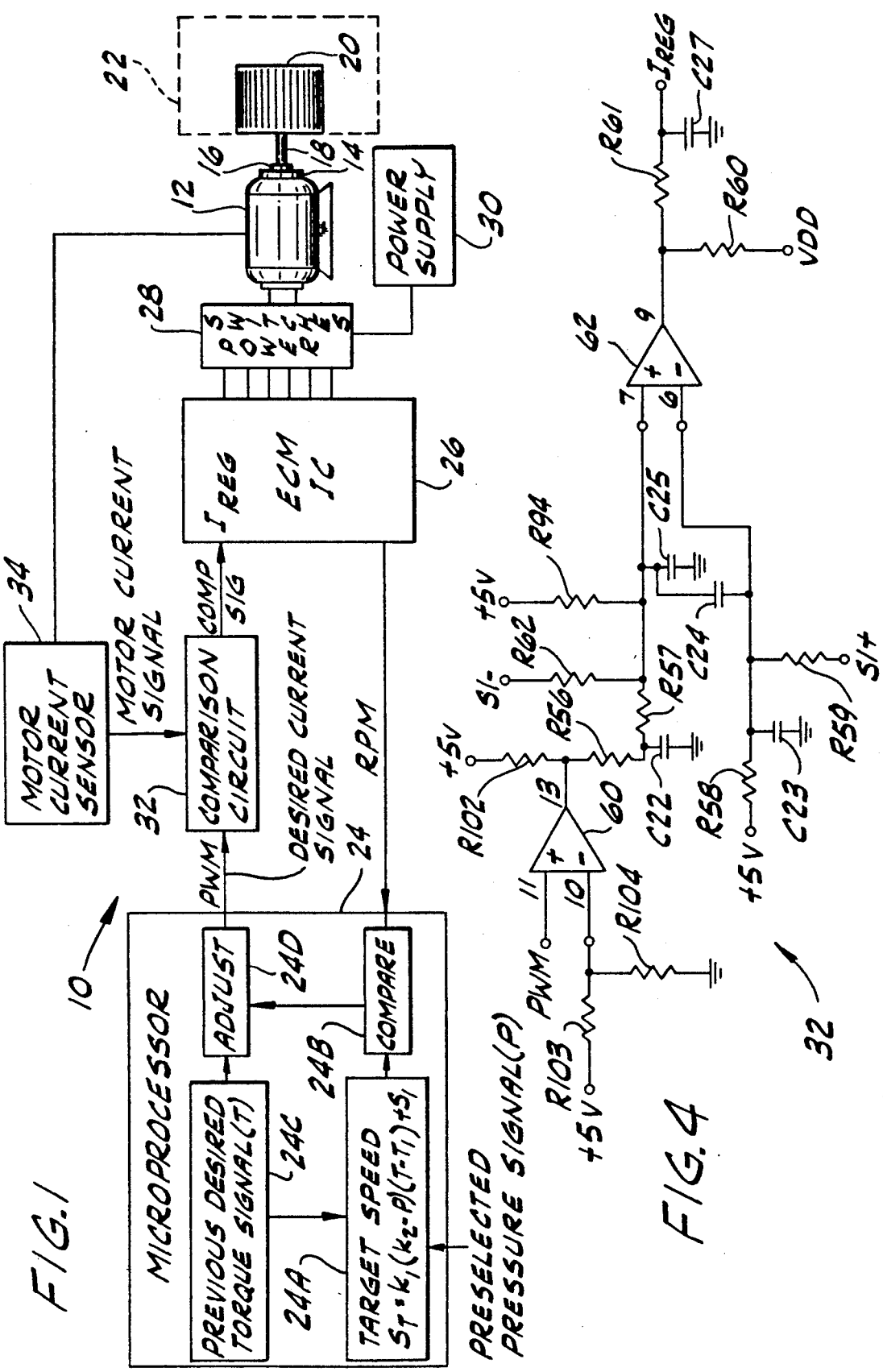

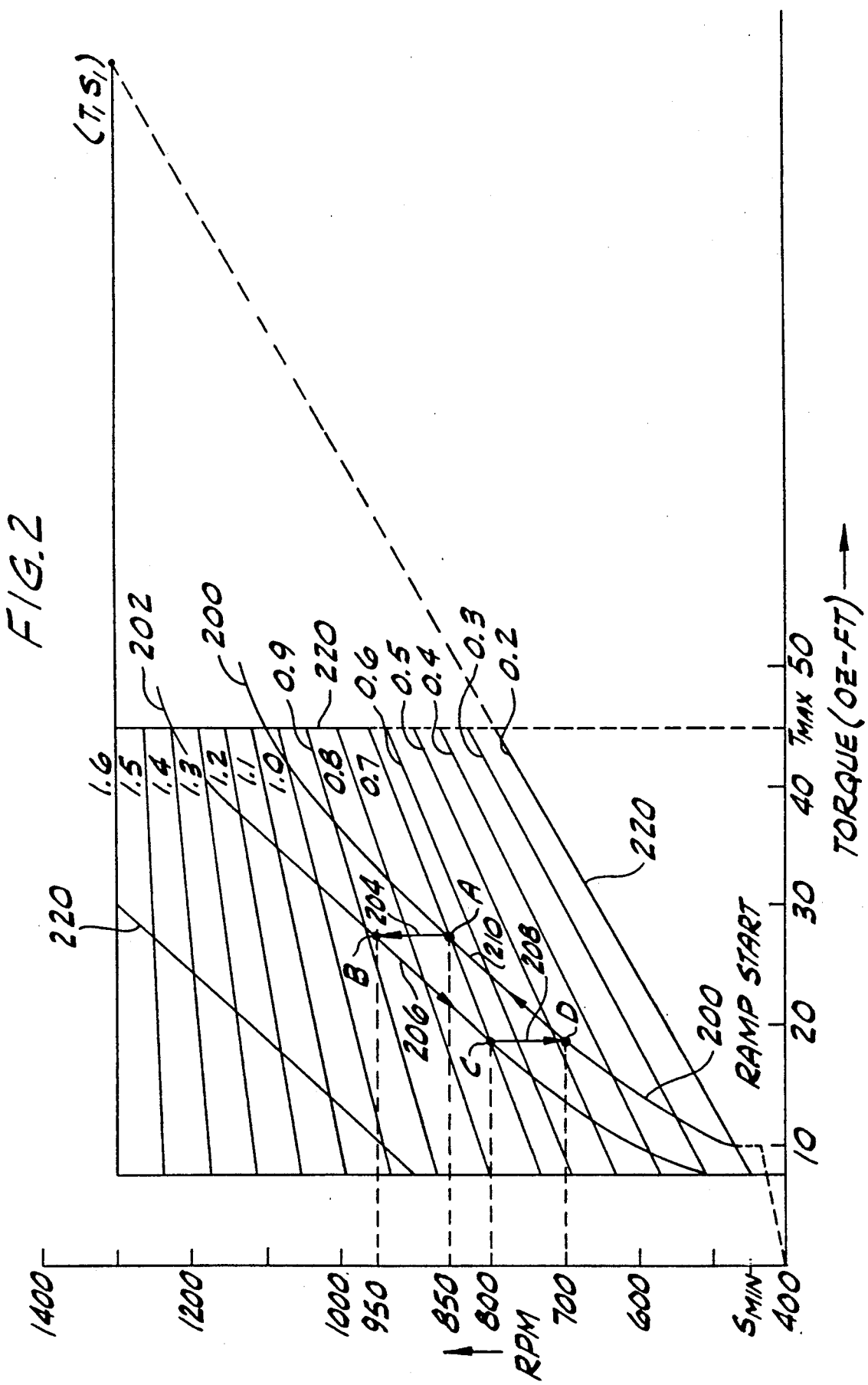

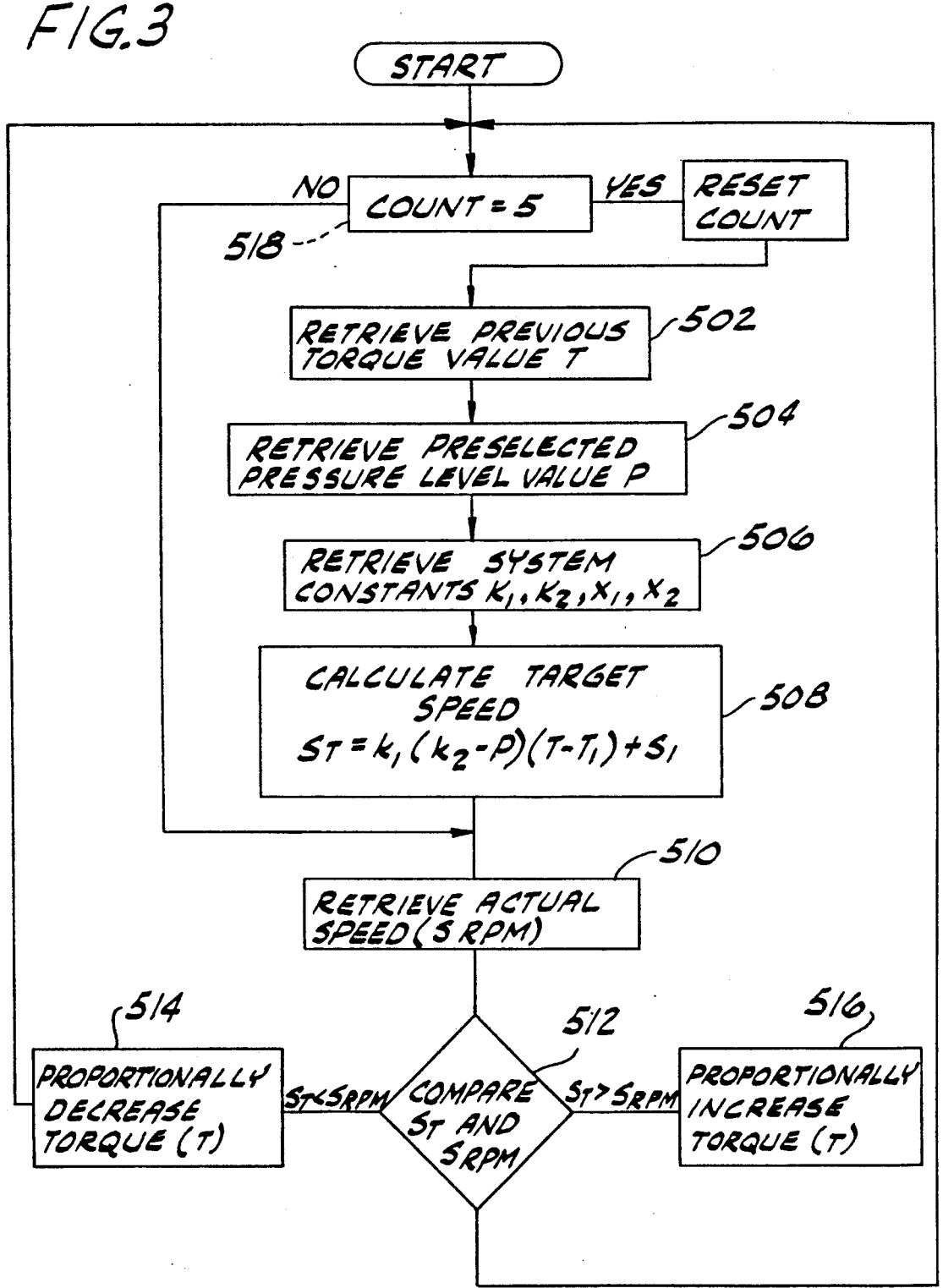

METHOD AND APPARATUS FOR CONTROLLING A BLOWER MOTOR IN AN AIR HANDLING SYSTEM TO PROVIDE CONSTANT PRESSURE

NOTICE

Copyright © 1989 General Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates in general to systems for conditioning the temperature of a space and, in particular, to a system for conditioning air and for maintaining a preselected pressure of the conditioned air through at least a part of the system regardless of variations in the flow restrictions therein, a method of operating a system for conditioning air, and a circuit.

BACKGROUND OF THE INVENTION

In the past, various different techniques are believed to have been utilized in an attempt to flow air through a contained space of a system including an apparatus for conditioning the temperature of the air. The pressure of such air is related to the flow restrictions associated with such system. Both the speed and torque of an electric motor driving a fan or blower to effect air flow through the system are affected by the flow restrictions in the system. The pressure of air through the apparatus also affects the motor speed and torque. Constant pressure at the output plenum of a zone control type heating or air conditioning system is desirable because it eliminates interaction between zones when dampers are adjusted. One approach of the past involved the rather laborious and time consuming matching of motor speed and torque with various flow restrictions to approximate the desired air pressure for the particular contained space of the particular apparatus or system in which such apparatus was employed. However, this did not accommodate unanticipated variations in the flow restrictions in the system caused by alterations in the system such as malfunctioning dampers or blocked vents. Another approach accomplishes constant pressure in the output plenum by measuring the plenum pressure with a transducer and adjusting the blower speed with a feedback loop to maintain desired pressure. However, this pressure transducer typically comprises a large proportion of the material cost of the control system.

If the fan or blower utilized in the past was of the fan or blade type, an increase in the flow restrictions acting on such fan caused an increase in the speed of the fan and the electric motor driving it and a concurrent pressure increase. Conversely, if the flow restrictions acting on the fan are decreased, the speed of the fan and electric motor and the pressure also decrease. Thus, the speed of the fans and electric motors, and consequently the pressure, varied inversely with a variation of the flow restrictions in the system.

As recognized in coassigned U.S. Pat. No. 4,806,833, incorporated herein by reference in its entirety, a decrease in the static pressure acting on a squirrel cage blower results in a decrease in the speed of the squirrel cage blower and the electric motor driving it. Conversely, if the static pressure acting on the squirrel cage blower is increased, the speed of the squirrel cage blower and its driving electric motor is increased. Thus, it was found that the speed of the squirrel cage blower and its driving electric motor varies directly with a variation in the static pressure. Accordingly, U.S. Pat. No. 4,806,833 discloses a method of operating a system for conditioning air including a variable speed blower for flowing the conditioned air through a contained space having a static pressure therein. In the system of this patent, the speed of the blower is set to provide a preselected flow rate at an existing static pressure in the contained space and the speed of the blower is altered only in response to a variation in the static pressure and only in following relation with the static pressure variation. The speed alteration of the blower is sensed, and the speed of the blower is altered in following relation with the sensed speed alteration to establish the preselected flow rate through the contained space at the varied static pressure acting on the blower.

Although this approach is an improvement over the prior art, it is only a rough approximation of the characteristics needed to achieve constant air flow with respect to changes in static pressures. In general, the systems of the prior art worked reasonably well over a limited range of air flows and static pressures by employing a single slope speed compensation technique. Coassigned Ser. No. 07/385,664, filed July 26, 1989, incorporated herein by reference, recognizes that a much more accurate approach to providing constant flow rate can be implemented in an air handling system by using a microprocessor controlled by a speed compensated torque algorithm. Such speed compensated torque allows the blower motor to maintain air flow in the system independent of variations in the static pressure in the duct work. However, constant flow rate is inapplicable to systems which require constant pressure in response to varying flow restrictions and which are not concerned with varying flow rates.

SUMMARY OF THE INVENTION

Among the several objects of the present invention may be noted the provision of an improved system for conditioning air and for maintaining a preselected air pressure of the conditioned air through at least a part of the system regardless of the flow restrictions therein, an improved method of operating the system, and an improved circuit which will overcome the above-discussed disadvantages or undesirable features, as well as others, of the prior art; the provision of such improved system and method in which the preselected pressure is accurately controlled; the provision of such improved system and method in which wide variations in the flow restrictions are readily accommodated; the provision of such improved system and method in which the torque of a dynamoelectric machine driving blower means is altered with variations in the speed of the motor to maintain constant air pressure independent of flow restrictions on the blower means and without the need for a pressure transducer; the provision of such improved system and method in which the energization of a dynamoelectric machine is adjustably regulated in order to maintain the preselected pressure independent of flow restriction variations acting on the blower means; and the provision of such improved system, method and circuit utilizing a microprocessor and other component parts which are simple in design, easily assembled and economically manufactured. These as well as other objects and advantageous features of the present invention will be in part apparent and in part pointed out hereinafter.

In general, an apparatus provided in one form of the invention for controlling a motor having a stationary assembly with a plurality of winding stages for carrying motor current and further having a rotatable assembly in driving relation with a fluid pump, such as a blower, in a fluid handling system, such as an air handling system. The apparatus provides control of the fluid pump over various operating conditions of the fluid handling system, such as over a range of flow restriction variations, to maintain as relatively constant a preselected parameter, such as pressure, of the system. The apparatus is adapted to receive a preselected parameter signal representing a preselected constant value of the parameter. Means provides a motor torque signal representative of the motor torque. Means provides a speed signal representative of the speed of the motor. A microprocessor which is responsive to both the preselected parameter signal and the speed signal generates a desired torque signal which is a function of the preselected parameter signal, the speed signal and a previous desired torque signal. Means compares the desired torque signal to the motor torque signal and supplies a comparison signal representative of the comparison. Means applies a motor voltage to one or more of the winding stages at a time in accordance with the comparison signal and commutates the winding stages in a preselected sequence to rotate the rotatable assembly whereby the fluid pump is driven by varying the motor speed according to motor torque to maintain the value of the parameter substantially constant and substantially independent of variations in the operating conditions of the fluid handling system.

In another form, the invention provides a system for conditioning air and for maintaining a preselected pressure of the conditioned air through a contained space with respect to flow restriction variations therein. A motor has a stationary assembly with a plurality of winding stages for carrying motor current and further has a rotatable assembly in driving relation with a blower in the contained space. Means detects the torque of the motor. Means detects the speed of the motor. A microprocessor, responsive to both the preselected pressure and the speed, determines a desired torque which is a function of the preselected pressure, the motor speed and a previous desired motor torque. Means compares the desired torque to the motor torque. Means applies a motor voltage to one or more of the winding stages at a time in accordance with the comparison and commutates the winding stages in a preselected sequence to rotate the rotatable assembly whereby the blower is driven by varying the motor torque according to motor speed to maintain substantially constant pressure in the contained space substantially independent of variations in the flow restriction.

In another form, the invention provides a method for controlling a dynamoelectric machine such as a motor having a stationary assembly with a plurality of winding stages for carrying motor current and further having a rotatable assembly in driving relation with a blower in an air handling system. The method provides control of the blower speed over a range of flow restriction variations to maintain air pressure in the system at a relatively constant preselected level. The method comprises the steps of: sensing the torque of the motor; sensing the speed of the motor; determining, by use of a microprocessor which is responsive to the preselected air pressure level and the sensed motor speed, a desired torque which is a function of the preselected air pressure, the sensed motor speed, and a previous desired torque; comparing the desired torque to the sensed motor torque; applying a motor voltage to one or more of the winding stages at a time in accordance with the comparison; and commutating the winding stages in a preselected sequence to rotate the rotatable assembly whereby the blower is driven by varying the motor speed according to motor torque to maintain substantially constant pressure in the system substantially independent of variations in the flow restriction.

BRIEF DESCRIPTION OF THE DRAWINGS

FIG. 1 is a block diagram of a preferred embodiment of an air handling system including the apparatus of the present invention.

FIG. 2 is a graph of speed along the ordinate versus torque along the abscissa of a motor operating at various air pressure demand levels under the control of apparatus of this invention.

FIG. 3 is a flow chart illustrating the steps used by the microprocessor to control motor torque and speed according to the invention.

FIG. 4 is a schematic diagram of the comparison circuit of FIG. 1.

Corresponding reference characters indicate corresponding parts throughout the several view of the drawings.

DETAILED DESCRIPTION OF THE PREFERRED EMBODIMENT

Referring to the drawings and particularly to FIG. 1, reference character 10 generally refers to an apparatus according to the invention for controlling a dynamoelectric machine such as motor 12 by varying the motor speed according to motor torque (i.e., torque compensated speed. Motor 12 includes a stationary assembly 14 with a plurality of winding stages for carrying motor current and further includes a rotatable assembly 16 in driving relation with a blower in an air handling system. As illustrated, rotatable assembly 16 is connected by drive shaft 18 to a squirrel cage blower 20 which is within a contained space such as an air handling system 22. The apparatus 10 provides control of the speed of blower 20 over a range of flow restriction variations within the air handling system to a maintain relatively constant preselected pressure in system 22. Although blower 20 is illustrated as a squirrel cage blower, it is contemplated that rotatable assembly 16 may be in driving relation with any type of blade, fan, blower or other device for moving air in air handling system 22.

In general, apparatus 10 is associated with a device or system for providing a preselected pressure signal (P) representing the preselected air pressure. For example, apparatus 10 may be associated with a thermostat or microprocessor which is controlling operation of the air handling system in response to sensors and operator input. In any case, apparatus 10 is adapted to receive a preselected air pressure signal representing the preselected air pressure level. Preferably, this signal has a dc voltage or a duty cycle which is directly proportional to the level of preselected air pressure. In general, the signal may be variable or it may have one of several preset levels. For example, in more sophisticated air handling systems which are controlled by microprocessors, the preselected pressure signal may vary over a range of, say, zero to five volts to represent a preselected air pressure from 0.2 to 1.5 inches of water. Alternatively, many air handling systems have two or three levels of operation corresponding to a low speed, a high speed and an override heating speed. The low speed may correspond to 0.2 inches of water, the high speed to 0.8 inches of water and the override heating speed to 1.5 inches of water. The preselected air pressure signal would then take the form of one of three voltage levels corresponding to these three different preselected levels of air pressures.

The preselected air pressure signal is provided to a microprocessor 10 along with a speed or rpm signal representative of the speed of motor 12. In general, apparatus 10 includes means for providing a speed signal representative of the sPeed of the motor such as integrated circuit 26. Reference character 26 refers to an integrated circuit (IC) which is generally a universal IC for use as a commutating circuit in combination with an electronically commutated motor. Such an IC is described in coassigned U.S. Pat. No 4,500,821 to Bitting et al., incorporated herein by reference. IC 26 constitutes means for applying a motor voltage to one or more of the winding stages and for commutating the winding stages in a preselected sequence to rotate the rotatable assembly. In general, IC 26 has an input $I_{reg}$ which receives a signal indicative of the desired torque or air pressure and defining the periods during which the motor voltage should be applied to the winding stages. IC 26 generally controls a plurality of power switching devices 28 which apply a voltage supplied by power supply 30 to the winding stages. IC 26 controls power switches 28 to commutate the winding stages of motor 12 in a preselected sequence to rotate the rotatable assembly of the motor 12.

In one preferred embodiment, IC 26 controls power switches 28 in accordance with the sensed back emf of the winding stages. By sensing the back emf, IC 26 generates a tachometer signal or rpm signal which is representative of the motor speed. This signal is provided to microprocessor 10. Microprocessor 10 is responsive to both the rpm signal provided by IC 26 and the preselected air pressure level signal (P) provided by the air handling system control. In response to these signals, microprocessor 24 generates a desired current signal which is a function of the preselected pressure level signal (P), the rpm signal and the previous desired current signal (T). Specifically, microprocessor 24 calculates a target speed ($S_t$), as indicated by reference character 24A, and compares it to the motor speed, as indicated by reference character 24B. Depending on the results of this comparison, the previous desired torque signal (T), as indicated by reference character 24C, is adjusted by increasing it or decreasing it, as indicated by reference character 24D. In effect, the desired current signal corresponds to a desired torque signal because the torque of the motor is directly proportional to the motor current. In one preferred embodiment, the desired current signal takes the form of a pulse width modulated (PWM) series of pulses having a duty cycle which is a function of both the preselected pressure level signal and the speed signal.

The desired current (torque) signal is compared by comparison circuit 32 to a motor current (torque) signal which represents the sensed motor current (torque). The motor current signal is generated by a motor current sensor 34 well known to one skilled in the art. For example, motor current sensor 34 may be a shunt resistor connected to the primary power supply line of the voltage applied to the motor windings. Alternatively, the motor current sensor may be a sensor such as disclosed in copending and coassigned U.S. patent application Ser. No. 235,995 filed Aug. 24, 1988, invented by William Archer entitled Method and Apparatus for Sensing Direct Current of One Polarity in a Conductor and Electronically Commutated Motor Control Responsive to Sense Motor Current. Alternatively, the motor current sensor may sense any parameter of the motor which is directly proportional to motor torque.

In the event that the motor current signal represents a motor current which is less than the desired current signal, comparison circuit 32 provides a comparison signal to the $I_{reg}$ input of IC 26 which indicates that the motor voltage should be continued to be applied to the motor windings. When the motor current signal indicates that the motor current is equal to the desired current signal or whenever the motor current signal indicates that the motor current is equal to or greater than the desired current signal, comparison circuit 32 generates a comparison signal provided to the $I_{reg}$ input of IC 26 which indicates that the motor voltage should not be applied any longer to the winding stages. In one preferred embodiment, if the comparison signal is high, IC 26 applies the motor voltage to the winding stages and if the comparison signal is low, IC 26 does not apply the motor voltage to the winding stages.

In one preferred embodiment according to the invention, microprocessor 24 implements a constant air pressure algorithm to control the motor 12 according to the principle of torque compensated speed. This type of control significantly enhances the independence of the air pressure generated by the blower to flow restrictions within air handling system 22. As indicated above, depending on the type of blower 20, changes in the flow restrictions within the air handling system 22 will result in changes in the speed of blower 20. The principle of torque compensated speed allows the motor to rotate the blower to maintain as relatively constant air pressure in the system 22 independent of variations in flow restrictions. In the past, the torque versus speed characteristics, such as suggested by Young in U.S. Pat. No. 4,806,833, were all straight lines parallel to each other. The slope of these parallel lines was the same for all air flow levels such as illustrated in FIG. 4 of the Young patent. In contrast, microprocessor 24 implements an algorithm so that the speed versus torque characteristics for every air pressure level have a different slope. This aspect of the invention is illustrated in FIG. 2. Except at low speeds which will be explained below, the speed torque characteristics for constant air pressure are a family of straight lines passing through a common convergence point with a slope (speed/torque) that is inversely proportional to the level of air pressure that is to be maintained, i.e., the slope decreases as pressure and speed increase. The proportionality constant depends on the size of the blower wheel and the number of blades. In the curves illustrated FIG. 2, it has been assumed that the blower 20 is a squirrel cage. As noted above, the speed torque characteristics may change depending on the type of blower being used and the type of system within which the blower is located.

In general, the desired current signal provided by microprocessor 24 comprises a pulse width modulated series of pulses having a duty cycle which is defined by an algorithm in which the duty cycle is a function of the preselected air pressure level signal, the rpm signal and the previous desired torque signal. In particular, microprocessor 24 operates in accordance with the following algorithm:

$$S_T = k_1(k_2 - P)(T - T_1) + S_1,$$

wherein T equals the duty cycle of the previous series of pulses and is directly proportional to the desired torque (current) needed to maintain the preselected level of air pressure, P equals the preselected pressure, $S_T$ equals the target motor speed and $k_1$, $k_2$, $S_1$ and $T_1$ are proportionality constants representing the characteristics of the blower 20 in the air handling system 22.

The torque is maintained above a minimum torque level $T_{min}$. The torque also has a preset maximum $T_{max}$ which depends on the system and cannot be exceeded. As shown in FIG. 2, the conditions for equal pressure plotted as speed vs. torque data define a family of curves within an area defined by the four lines 220 referred to by reference character. The family of curves is nearly straight lines whose slope decreases as pressure increases. For the constant pressure algorithm according to the invention, the lines all pass through a common convergence point ($T_1, S_1$) at the upper right of the FIG. 2 graph. Consequently, the maximum speed $S_{max}$ is equal to $S_1$ and is defined by a line substantially parallel to the x-axis and passing through the convergence point so that:

$$S_{max} = k_1(k_2 - P_{max})(T - T_1) + S_1$$

Since $S_{max} = S_1$, then $$k_2 = P_{max}.$$

In other words, for maximum pressure, $$S_T = S_1 = S_{max}.$$

Although microprocessor 24 has been described as operating in accordance with an algorithm, one skilled in the art will readily recognize that the microprocessor may also operate in accordance with a table defining the various speed versus torque characteristics of the system.

It is also readily apparent to one skilled in the art that the suggested algorithm, which is a single slope algorithm, is still an approximation of the ideal speed versus torque characteristics at constant pressure and that a more detailed, complex or higher order algorithm or table may be used to obtain a closer approximation. The table would be generated in the following manner. A value corresponding to each preselected air pressure and for each increment of motor speed would be calculated and stored within memory for access by the microprocessor. Depending on the size of the table and the increments, such a table could provide a nonlinear or closer approximation of the ideal speed versus torque characteristics for each preselected air pressure.

It has been found that the suggested algorithm is not limited to a small range of air pressures and flow restrictions. Furthermore, the algorithm is universal and with changes to the proportionality constant to account for different blower wheels and air handling systems, the apparatus according to the invention can be used in any type of blower system. For example, this system can be successfully implemented for blowers used in furnaces, in heat pumps, in central air conditioning systems and in other air handling systems with capacities of varying range and for different manufacturers.

The microprocessor may also provide protection against a locked rotatable assembly by functioning as means for disabling operation of the motor in the event that a speed signal is not provided to the microprocessor. In general, if an RPM signal is not provided to the microprocessor within a preset period of time, say 12 seconds, after a desired current (torque) signal is generated, the microprocessor can shut down to prevent motor damage. In one preferred embodiment wherein the microprocessor provides a soft start, i.e., a slowly increasing desired torque signal, the microprocessor resets if an RPM signal is not detected after 12 seconds. After 8 reset cycles, the microprocessor shuts down motor operation.

Considering now the graph of FIG. 2, there is shown a sequence of solid lines illustrated in a relationship between the speed and torque for a typical air conditioning system blower. Motor 12 is connected for driving squirrel cage blower 20 in system 22 built in accordance with the preferred embodiment of the invention. Each of the solid lines on the graph labeled in increments of one tenth from 0.2 to 1.6 represents a constant pressure line. These lines illustrate the near linear relationship between speed and torque and the variation in speed and torque as flow restrictions decrease for any given pressure. At low torques, each solid line takes the form of a vertical line essentially defining a constant minimum torque $T_{st}$ (current). The setting of the maximum torque depends on the system and safety factors.

In operation, the microprocessor 24 executes the steps illustrated in FIG. 3. First, in step 502 the microprocessor retrieves the previous torque value (T) used to generate the desired current signal. In step 504, the preselected pressure level value P as indicated to the microprocessor 24 by the system controller is retrieved. Step 506 retrieves the system constants which have been stored in the microprocessor memory. Next, in step 508, the microprocessor calculates target speed $S_T$ based on the preselected pressure defined by the system controller and the previous torque of the system as retrieved in step 502. The actual speed is then retrieved at step 510 based on the RPM signal being provided to the microprocessor 24 by the integrated circuit 26. At step 512, the microprocessor 24 compares the target speed to the actual speed. In the event that the target speed is less than the actual speed, the microprocessor executes step 514 to proportionally decrease the torque T by reducing the duty cycle of the PWM signal (desired current signal) provided to the comparison circuit 32. In the event that the target speed is greater than the actual speed, the microprocessor executes step 516 to proportionally increase the torque T by increasing the duty cycle of the PWM signal. In the event that the target speed equals the actual speed or after a change in the PWM duty cycle, the closed-loop returns to step 502 to recompute the operation. Optionally, a count step 518 may be used between the start and step 502 if recalculating the target speed (step 508) is done less frequently than comparing the target speed to the actual speed (step 512). For example, in one preferred embodiment, the target speed is recalculated after five adjustments to the torque. When the count equals five, the count is reset and the program proceeds to step 502 to recalculate the target speed.

As a result, closed-loop speed control portion of the software raises or lowers the torque T in order to attain the new target speed. The target speed and the duty cycle are alternatively adjusted until the operating point converges onto the line of constant pressure defined by the system controller. If the flow restrictions change, such as due to a damper adjustment, the speed and torque will reconverge to a different point on the pressure line.

Curve 200 represents speed-torque points for a first particular blower restriction. Curve 202 represents speed-torque points for a second particular blower restriction greater than the first particular blower restriction. For example, consider a system operating on the first restriction line 200 at 0.7 inches of water pressure at point A having a speed of approximately 850 RPM and a torque of approximately 28 oz.-ft. A sudden increase in blower restriction to the second restriction line 202 will cause an immediate increase in speed to approximately 950 RPM shifting the operating point from point A to point B as indicated by arrow 204. Thereafter, microprocessor 24 will determine that the target speed (850) is less than the actual speed (950) and execute step 514 to decrease the voltage applied to the motor windings by decreasing the duty cycle of the PWM desired current signal to reduce the torque and speed to point C, as indicated by arrow 206. As a result, microprocessor 24 controls the motor to reconverge its speed-torque operating point to an operating point C on the line representing 0.6 inches of water pressure. Similarly, a sudden decrease in blower restriction to the first restriction line 200 will cause an immediate decrease in speed to approximately 700 RPM shifting the operating point from point C to point D as indicated by arrow 208. Thereafter, microprocessor will determine that the target speed (800) is greater than the actual speed (700) at point D and execute step 516 to increase the voltage applied to the motor windings by increasing the duty cycle of the PWM desired current signal to increase torque and speed to point A, as indicated by arrow 210. Once again, microprocessor 24 controls the motor to reconverge its speed-torque operating point to a point on the line representing 0.6 inches of water pressure.

In one preferred embodiment, a soft start (see coassigned U.S. Pat. No. 4,763,347, incorporated herein by reference) is initially used by the microprocessor and the pressure algorithm is not engaged. When the RPM signal indicates 200 RPMs, the algorithm is turned on and the target speed is calculated from whatever the torque setting, as indicated by the duty cycle of the PWM desired current signal, happens to be. A valid speed objective can be calculated for any starting torque. At the end of the soft start, the torque is usually 18% but it could be less if the rotatable assembly was coasting when the motor was started.

In general, $$S_T = k_1(k_2 - P)(T - T_1) + S_1 \quad (1)$$

where the y-axis intercept, is $$S_1 - T_1 k_1(k_2 - P) \quad (2)$$

The slope between two points $(T_1, S_1)$ and $(T_2, S_2)$ is $$\text{slope} = k_1(k_2 - P) = \frac{S_2 - S_1}{T_2 - T_1} \quad (3)$$

and the y-axis intercept is $$S_1 - k_1(k_2 + P)T_1 \quad (4)$$

Consider Table I which is an example of predetermined data for a particular air handling system.

TABLE I

| P | Slope | Y-Intercept |
|---|---|---|
| 0.20 | 12.35 | 386 |
| 0.40 | 9.05 | 526 |
| 0.60 | 7.18 | 643 |
| 0.80 | 5.69 | 753 |
| 1.00 | 4.85 | 846 |
| 1.20 | 3.58 | 956 |
| 1.40 | 2.98 | 1041 |

Substituting the data for pressures of 0.40 and 1.20 in equation (3) results in $$k_1(k_2 - 0.40) = 9.05$$

$$k_1(k_2 - 1.20) = 3.58$$

Solving for $k_1$, $k_2$ yields $$k_1 = 6.84 \text{ and } k_2 = 1.72$$

Substituting base values into equation (4) results $$526 = S_1 - 6.84(1.72 - 0.40)T_1$$

$$956 = S_1 - 6.84(1.72 - 1.20)T_1$$

Solving for $T_1$, $S_1$ yields:

$$T_1 = 78.6$$

$$S_1 = 1237$$

Substituting these values into equation (1) yields:

$$S_T' = 6.84(1.72 - P')(T' - 78.6) + 1237 \quad (5)$$

where $S'$, $P'$ and $T'$ are real units of speed, pressure and torque, respectively. Converting equation (5) to units used internally by an 8-bit microprocessor results in the following. If speed $S_T'$ ranges from 0 to 1275 and this corresponds to an internal range of 0 to 255, then the internal speed variable S is:

$$S = S'/5$$

Similarly, if torque $T'$ ranges from 0 to 42 and this corresponds to an internal range of 0 to 255, then the internal torque variable T is:

$$T = 6.07T'$$

Similarly, if pressure $P'$ ranges from 0 to 1.5 and this corresponds to an internal range of 0 to 255, then the internal pressure constant P is:

$$P = 170P'$$

Equation (5) in internal microcontroller notation becomes:

$$5S = 6.84 \frac{(292 - P)}{170} \frac{(T - 477)}{6.07} + 247 \quad (6)$$

Simplifying:

$$S = 247 - (292 - P)(477 - T)/754$$

In 8-bit mathematics, the pressure P is a pressure demand factor having a minimum of 22.6. Re-scaling equation (6) yields $$S = 247 - (P255 - P^*)(477 - T)/657$$

where $P^* = 0.873 P$, and $P^* = 148P'$

Referring to FIG. 4, one preferred embodiment of comparison circuit 32 according to the invention is illustrated. The preselected air pressure signal, as a PWM signal, is provided to the noninverting input 11 of comparator 60 which functions as a buffer. Comparator 60 is an open collector comparator well known in the prior art providing a grounded output when the dc voltage applied to the noninverting input is greater than the dc voltage applied to the inverting input. A reference voltage is applied to the inverting input 10 of comparator 60 generated by the voltage divider formed by resistors R103 and R104. Output 13 of comparator 60 essentially follows input 11. A dc voltage is applied to capacitor C22 as divided by resistors R102 and R56. Output 13 essentially permits capacitor C22 to charge whenever the PWM signal applied to input 11 is high so that the charge on capacitor C22 represents the duty cycle of the PWM signal. In other words, capacitor C22 functions as an averager to produce a voltage representative of the duty cycle of the PWM signal applied to input 11. This is because the duty cycle of the PWM signal determines the amount of charging of capacitor C22. The maximum voltage level on capacitor C22 is adjusted by resistor R57. Terminal S1− represents the negative side of the shunt resistor. The voltage of the S1− terminal as adjusted by resistor R62 constitutes a bias point or reference for comparison of the motor current. This voltage is summed with the adjusted voltage provided after resistor R57 and applied to the noninverting input 7 of comparator 62. This voltage is further adjusted by applying a 5 volt bias signal through resistor R94.

The inverting input 6 of comparator 62 is then provided with a signal representing the motor current. In particular, terminal S1+ is connected to the positive side of the shunt resistor measuring the motor current and is applied to the inverting input 6 of comparator 62 as adjusted by the 5 volt bias signal applied through resistor R58. Capacitors C23, C24 and C25 provide noise filtering.

As a result, comparator 62 receives a reference adjusted signal at its noninverting input 7 which represents the duty cycle of the PWM signal, i.e., the desired current, and the inverting input 6 receives a signal representative of the motor current signal, i.e., the motor current. Comparator 62 compares these signals and provides a comparison signal at its output 9 representative of the difference. When the signal at input 7 is higher than the signal at input 6, indicating that the motor current is less than desired, output 9 goes high to apply voltage $V_{DD}$ through resistor R60 and resistor R61 to the $I_{reg}$ input of IC 26. This indicates to the IC 26 to apply motor voltage to the winding stages. In the event that signal applied to input 6 is greater than the signal applied to input 7, indicating that the motor current is greater than the desired current, output 9 goes low and is grounded to indicate to IC 26 that the voltage should not be applied to the motor windings. Capacitor C27 provides further noise filtering.

Resistors R56 and R57 determine the maximum voltage to which capacitor C22 can be charged. This maximum voltage essentially defines the torque limit $T_{max}$ of the system as illustrated in FIG. 2. In other words, selecting values of resistors R56 and R57 selects the dc voltage to which capacitor C22 gets charged at a 100% duty cycle. This maximum voltage corresponds to the maximum torque. To some extent, resistors R62 and R94 adjust this maximum torque limit.

The values of the constants $k_1$, $k_2$ and $S_1$ may be programmed into the microprocessor or may be selectively indicated to the microprocessor as suggested in copending coassigned Ser. No. 07/385,664, filed July 26, 1989 and incorporated herein by reference.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for controlling a motor having a stationary assembly with a plurality of winding stages for carrying motor current and further having a rotatable assembly in driving relation with a blower in an air handling system, the apparatus providing control of the blower speed over a range of flow restriction variations to maintain air pressure in the system at a relatively constant preselected level, and which apparatus is adapted to receive a preselected pressure signal representing the preselected pressure level, the apparatus comprising:

means for providing a motor torque signal representative of the torque of the motor;

means for providing a speed signal representative of the speed of the motor;

a microprocessor, responsive to both the preselected pressure signal and the speed signal, for generating a desired torque signal which is a function of the preselected pressure signal, the speed signal, and a previous desired torque signal;

means for comparing the desired torque signal to the motor torque signal and for supplying a comparison signal representative of the comparison; and means for applying a motor voltage to one or more of the winding stages at a time in accordance with the comparison signal and for commutating the winding stages in a preselected sequence to rotate the rotatable assembly whereby the blower is driven by varying the motor speed according to motor torque to maintain substantially constant pressure in the system substantially independent of variations in the flow restrictions.

2. The apparatus of claim 1 wherein the desired torque signal generated by said microprocessor comprises a pulse width modulated (PWM) series of pulses having a duty cycle which is a function of the preselected pressure signal, the speed signal and the previous desired torque signal.

3. The apparatus of claim 2 wherein the duty cycle of the PWM series of pulses generated by said microprocessor is a function of a comparison of the speed signal to a target speed defined by an algorithm which is a function of the preselected pressure signal and the previous desired torque signal.

4. The apparatus of claim 3 wherein said microprocessor operates in accordance with the following algorithm:

$$S_T = k_1(k_2 - P)(T - T_1) + S_1$$

wherein T equals the duty cycle of the previous series of pulses, $T_1$ equals a constant, P equals the preselected air pressure level, $S_T$ equals the target motor speed and $k_1$, $k_2$ and $S_1$ are constants representing the characteristics of the blower in the air handling system.

5. The apparatus of claim 4 further wherein $T_1$ equals a preset torque and $S_1$ equals a preset speed value such that $(T_1, S_1)$ defines a point on all curves defined by the algorithm.

6. The apparatus of claim 1 wherein the desired torque signal is a function of a comparison of a target speed which is a function of the preselected air pressure level and the speed of the motor.

7. The apparatus of claim 6 wherein said microprocessor increases the desired torque proportionally in response to variations in the target speed as compared to the speed of the motor.

8. The apparatus of claim 6 wherein the target speed is specified by an algorithm which defines the target speed as a function of both the preselected pressure level and the previous desired torque signal.

9. The apparatus of claim 8 wherein at least part of the algorithm defines a linear function of torque versus speed which passes through a common convergence point and has a slope inversely proportional to the preselected air pressure.

10. The apparatus of claim 1 wherein said microprocessor adjusts the desired torque signal in response to a comparison of the motor speed to a target speed ST defined by the following algorithm:

$$S_T = k_1(k_2 - P)(T - T_1) + S_1$$

wherein T equals the previous desired torque of the motor, $T_1$ equals a constant, P equals the preselected air pressure level, $S_T$ equals the motor speed and $k_1$, $k_2$ and $S_1$ are constants representing the characteristics of the blower in the air handling system.

11. The apparatus of claim 10 further wherein $T_1$ equals a preset torque and $S_1$ equals a preset speed value such that $(T_1, S_1)$ defines a point on all curves defined by the algorithm.

12. The apparatus of claim 1 wherein the desired torque signal generated by said microprocessor is defined by a table specifying various values for the torque signal, each said value corresponding to a difference between the speed function of the preselected pressure signal and the previous desired torque signal.

13. The apparatus of claim 12 wherein said microprocessor operates in accordance with the following algorithm:

$$S_T = k_1(k_2 - P)(T - T_1) + S_1$$

wherein T equals the duty cycle of the previous series of pulses, $T_1$ equals a constant, P equals the preselected air pressure level $S_T$ equals the target motor speed and $k_1$, $k_2$ and $S_1$ are constants representing the characteristics of the blower in the air handling system.

14. The apparatus of claim 1 wherein said microprocessor comprises means for varying the torque of the motor in proportion to variations in the motor speed.

15. System for conditioning air and for maintaining a preselected pressure of the conditioned air through a contained space with respect to flow restriction variations therein, the system comprising:
 a motor having a stationary assembly with a plurality of winding stages for carrying motor current and further having a rotatable assembly in driving relation with a blower in the contained space;
 means for detecting the torque of the motor;
 means for detecting the speed of the motor;
 a microprocessor, responsive to both the preselected pressure and the speed, for determining a desired torque which is a function of the preselected pressure, the motor speed and a previous desired motor torque;
 means for comparing the desired torque to the motor torque; and
 means for applying a motor voltage to one or more of the winding stages at a time in accordance with the comparison and for commutating the winding stages in a preselected sequence to rotate the rotatable assembly whereby the blower is driven by varying the motor speed according to motor torque to maintain substantially constant pressure in the contained space substantially independent of variations in the flow restriction.

16. The system of claim 15 wherein said microprocessor increases the desired torque proportionally in response to variations in the target speed as compared to the speed of the motor.

17. Method for controlling a dynamoelectric machine having a stationary assembly with a plurality of winding stages for carrying motor current and further having a rotatable assembly in driving relation with a blower in an air handling system, the method providing control of the blower speed over a range of flow restriction variations to maintain air pressure in the system at a relatively constant preselected level, the method comprising the steps of:
 sensing the torque of the motor;
 sensing the speed of the motor;
 determining, by use of a microprocessor which is responsive to the preselected air pressure level and the sensed motor speed, a desired torque which is a function of the preselected air pressure level, the sensed motor speed and a previous desired torque;
 comparing the desired torque to the sensed motor torque;
 applying a motor voltage to one or more of the winding stages at a time in accordance with the comparison; and
 commutating the winding stages in a preselected sequence to rotate the rotatable assembly whereby the blower is driven by varying the motor speed according to the motor torque to maintain substantially constant pressure in the system substantially independent of variations in the flow restriction.

18. The method of claim 17 wherein the commutating step comprises varying the torque of the motor in proportion to variations in a comparison of the motor speed to a target motor speed defined by an algorithm which is a function of the preselected pressure level and the previous desired torque.

19. The method of claim 18 wherein the varying step is according to the following algorithm:

$$S_T = k_1(k_2 - P)(T - T_1) + S_1$$

wherein T equals the desired torque of the motor, $T_1$ equals a constant, P equals the preselected air pressure level, $S_T$ equals the target motor speed and $k_1$, $k_2$ and $S_1$ are constants representing the characteristics of the blower in the air handling system.

20. Apparatus for controlling a motor having a stationary assembly with a plurality of winding stages for carrying motor current and further having a rotatable assembly in driving relation with a fluid pump in a fluid handling system, the apparatus providing control of the fluid pump over various operating conditions of the fluid handling system to maintain as relatively constant a preselected parameter of the system, and which apparatus is adapted to receive a preselected parameter signal representing a preselected constant value of the parameter, the apparatus comprising:

means for providing a motor torque signal representative of the torque of the motor;

means for providing a speed signal representative of the speed of the motor;

a microprocessor, responsive to both the preselected parameter signal and the speed signal, for generating a desired torque signal which is a function of the preselected parameter signal, the speed signal and a previous desired torque signal;

means for comparing the desired torque signal to the motor torque and for supplying a comparison signal representative of the comparison; and means for applying a motor voltage to one or more of the winding stages at a time in accordance with the comparison signal and for commutating the winding stages in a preselected sequence to rotate the rotatable assembly whereby the fluid pump is driven by varying the motor speed according to the motor torque to maintain the value of the parameter substantially constant and substantially independent of variations in the operating conditions of the fluid handling system.

21. System for conditioning fluid and for maintaining as substantially constant a preselected parameter of the conditioned fluid through a contained space with respect to variations in operating conditions of the contained space, the system comprising:

a motor having a stationary assembly with a plurality of winding stages for carrying motor current and further having a rotatable assembly in driving relation with a fluid pump in the contained space;

means for detecting the torque of the motor;

means for providing a speed signal representative of the speed of the motor;

a microprocessor, responsive to both a preselected constant value of the parameter and the speed, for determining a desired torque which is a function of the constant value of the preselected parameter, the motor speed and a previous desired motor torque;

means for comparing the desired torque to the motor torque; and means for applying a motor voltage to one or more of the winding stages at a time in accordance with the comparison and for commutating the winding stages in a preselected sequence to rotate the rotatable assembly whereby the fluid pump is driven by varying the motor speed according to motor torque to maintain the value of the parameter substantially constant and substantially independent of variations in the operating conditions of the contained space.

22. Method for controlling a motor having a stationary assembly with a plurality of winding stages for carrying motor current and further having a rotatable assembly in driving relation with a fluid pump in a fluid handling system, the method providing control of the fluid pump over variations in the operating conditions of the fluid handling system to maintain as relatively constant a preselected parameter of the system, the method comprising the steps of:

sensing the torque of the motor;

sensing the speed of the motor;

determining, by use of a microprocessor which is responsive to a preselected value of the parameter and the sensed motor speed, a desired torque which is a function of the constant value of the preselected parameter, the sensed motor speed and a previous desired motor torque;

comparing the desired torque to the sensed motor torque;

applying a motor voltage to one or more of the winding stages at a time in accordance with the comparison; and commutating the winding stages in a preselected sequence to rotate the rotatable assembly whereby the fluid pump is driven by varying the motor speed according to motor torque to maintain the value of the parameter substantially constant and substantially independent of variations in the operating conditions of the fluid handling system.

* * * * *